United States Patent

Santimauro et al.

[15] 3,668,225
[45] June 6, 1972

[54] PROCESS FOR THE PREPARATION OF N,N'-DI-1-ANTHRAQUINONYLPHTHALAMIDE

[72] Inventors: John F. Santimauro, Wyckoff, N.J.; Herman Gerson, New York, N.Y.

[73] Assignee: Allied Chemical Corporation, New York, N.Y.

[22] Filed: May 6, 1969

[21] Appl. No.: 822,227

[52] U.S. Cl. .................................................. 260/368
[51] Int. Cl. ................................................. C09b 1/42
[58] Field of Search ....................................... 260/368

[56] References Cited

UNITED STATES PATENTS 2,727,044  12/1955  Pizzarello et al. ..................... 260/368
2,914,542  11/1959  Randall et al. ......................... 260/368

FOREIGN PATENTS OR APPLICATIONS 982,709  2/1965  Great Britain ......................... 260/368

Primary Examiner—Lorraine A. Weinberger
Assistant Examiner—E. Jane Skelly
Attorney—Jay P. Friedenson

[57] ABSTRACT

Reaction of a phthalic anhydride with an aminoanthraquinone in the presence of phosphorus oxychloride and/or phosphorus trichloride with perchloroethylene as solvent affords N,N'-di-anthraquinonylphthalamide pigment in high yield and in easily isolatable form. In the preparation of N,N'-di-1-anthraquinonylphthalamide, presence of an "active oxygen"-containing compound in the reaction medium affords a reddish-yellow alpha polymorph; absence of an "active oxygen"-containing compound affords a novel greenish-yellow beta polymorph.

9 Claims, 2 Drawing Figures

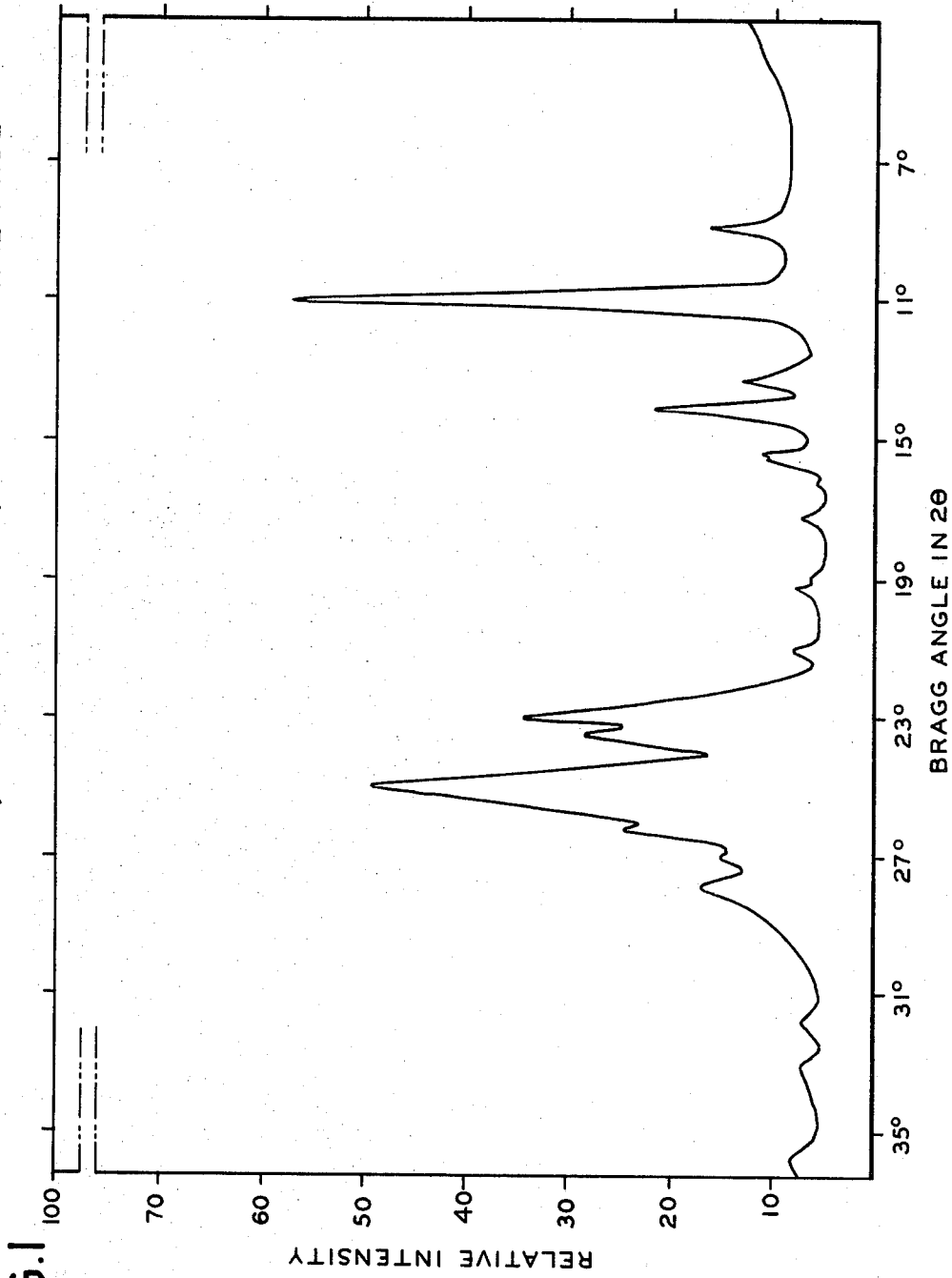

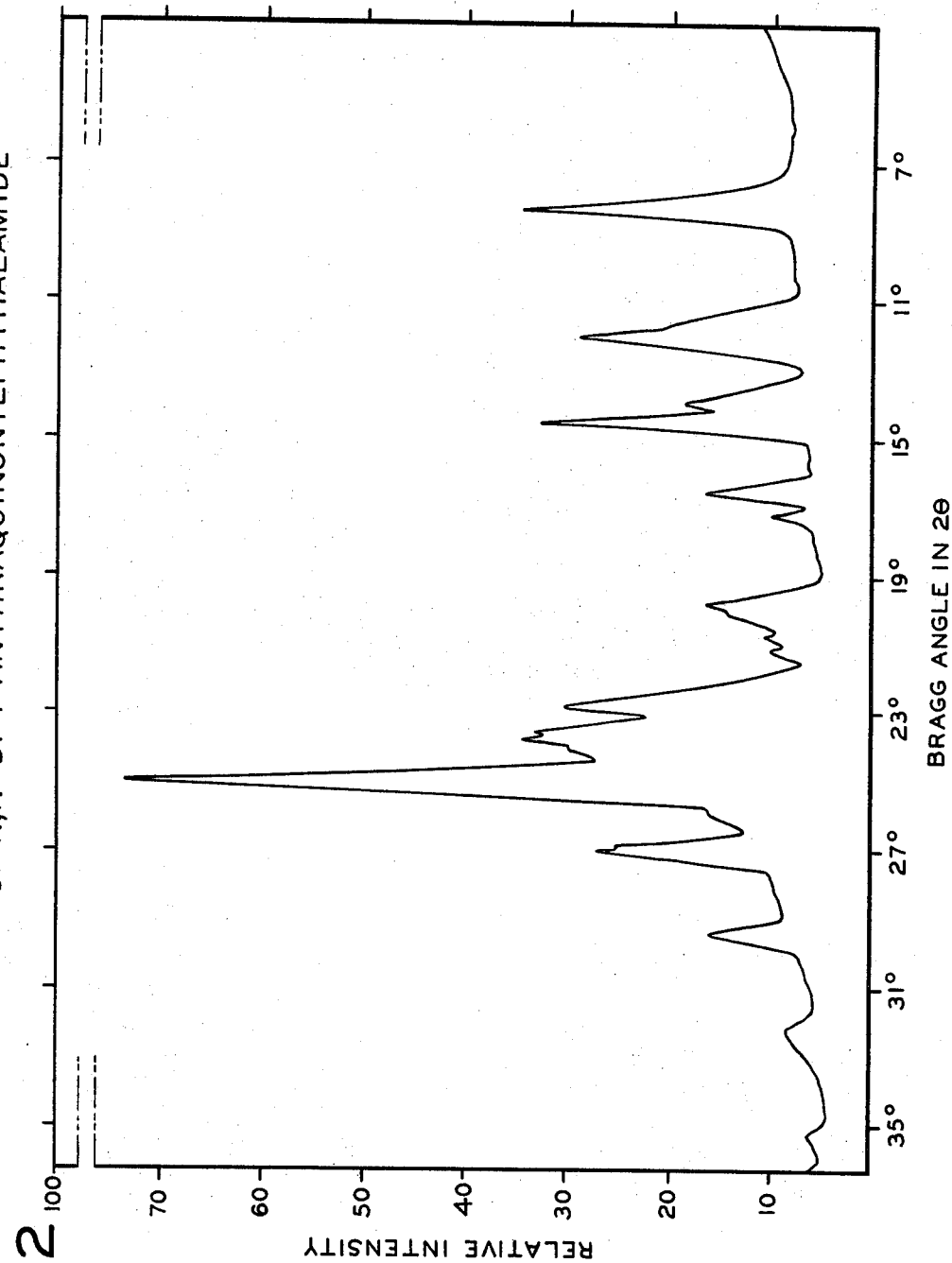

PROCESS FOR THE PREPARATION OF N,N'-DI-1-ANTHRAQUINONYLPHTHALAMIDE

BACKGROUND OF THE INVENTION

This invention relates to dianthraquinonylphthalamide dyes; in particular, it relates to an improved process for the production thereof by the reaction of phthalic anhydride with 1-aminoanthraquinone.

N,N'-Di-1-anthraquinonylphthalamide is a well known yellow pigment. U.S. Pat. No. 2,727,044 teaches the preparation of this material by reaction of symmetrical o-phthalyl chloride and 1-aminoanthraquinone in any high-boiling inert solvent. The product is a bright orange-yellow pigment having unusual resistance to fading. When an excess of o-phthalyl chloride is employed according to the process of U.S. Pat. No. 2,914,542, the pigment has a bright greenish-yellow color and fluoresces.

However, inasmuch as o-phthalyl chloride is relatively expensive and is difficult to handle, a procedure employing a different reagent would be preferred. When the compound is made by reaction of phthalic anhydride and phosphorus pentachloride with 1-aminoanthraquinone, the product is a brownish-yellow powder with practically no tinctorial value and valueless as a pigment. British Pat. 982,709 provides a successful procedure for production of the valuable pigments from phthalic anhydride by conducting the reaction of that reagent with an aminoanthraquinone in the presence of phosphorus oxychloride and an acid-binding agent, e.g. calcium oxide, in an anhydrous inert solvent. The reaction is catalyzed by acid amides such as urea, acetamide, etc. Depending upon the amount of phosphorus oxychloride employed, the color of the resulting pigment varies from orange-yellow to lemon-yellow. However, the reaction product is isolated by cooling the reaction mixture, diluting with a solvent such as methanol, then filtering and washing. Because of this complex recovery procedure, which requires costly solvent recovery steps for the relatively large volumes of low boiling and hazardous solvents used for dilution and washing, this process is inconvenient and uneconomical.

SUMMARY OF THE INVENTION

According to the instant invention, in the process for the preparation of a N,N'-dianthraquinonylphthalamide by reacting an orthophthalic anhydride with an aminoanthraquinone in the presence of phosphorus oxychloride or phosphorus trichloride in an inert solvent, it has been unexpectedly found that employing perchloroethylene as the inert solvent affords the desired product in high yield and isolatable in a simple, efficient manner.

It has been further found that different polymorphs of N,N'-di-1-anthraquinonylphthalamide can be prepared by variations in the instant improved process. A reddish-yellow pigment, hereinafter referred to as the alpha polymorph, is obtained when the reaction is conducted in the presence of an "active oxygen"-containing compound, and a greenish-yellow pigment, hereinafter referred to as the beta polymorph, is obtained when the reaction is conducted in the absence of an "active oxygen"-containing compound.

BRIEF DESCRIPTION OF THE DRAWINGS

For a better understanding of the instant invention, reference is made to the accompanying drawings, wherein:

FIG. 1 illustrates the X-ray diffraction powder pattern of the alpha polymorph of N,N'-di-1-anthraquinonylphthalamide; and FIG. 2 illustrates the X-ray diffraction powder pattern of the beta polymorph of N,N'-di-1-anthraquinonylphthalamide.

DETAILED DESCRIPTION OF THE INVENTION

By use of perchloroethylene as the inert solvent, N,N'-dianthraquinonylphthalamides are conveniently prepared by the instant process according to the following sequence:

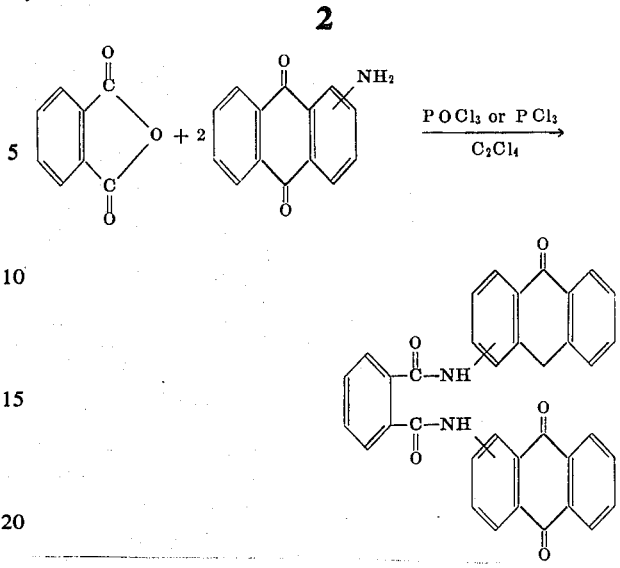

The phthalic anhydride may be substituted with chlorine, bromine and nitro and the anthraquinone nucleus, substituted at either the 1 or 2 position with an amino moiety, may be further substituted with chlorine and nitro.

The phthalamide product is obtained in high yields, very often exceeding 90 percent of theory, and can be conveniently isolated by steam distilling the perchloroethylene solvent from the reaction mass and filtering the residue. No dilution of the reaction mass with low boiling and hazardous solvents is required, nor is it necessary to wash the crude product with organic solvents for good purity. Recovery of the perchloroethylene from the steam distillate is readily and efficiently accomplished by phase separation, and the recovered solvent may be reused, after drying if desired, in subsequent runs of the procedure.

Typical of the aminoanthraquinones used in this process are the following:
1-aminoanthraquinone
2-aminoanthraquinone
1-amino-4-chloroanthraquinone
1-amino-5-chloroanthraquinone
1-amino-7-nitroanthraquinone
2-amino-6-nitroanthraquinone
2-amino-8-chloroanthraquinone Typical of the o-phthalic anhydrides used in this process are the following:
phthalic anhydride
4-chlorophthalic anhydride
4-nitrophthalic anhydride
4,5-dibromophthalic anhydride
tetrachlorophthalic anhydride
4,6-dinitrophthalic anhydride The preferred compounds, in view of their effectiveness, relatively moderate cost, and excellence of the pigment obtained therefrom, are 1-aminoanthraquinone and phthalic anhydride.

At least about 1.5 mols of phthalic anhydride per mol of aminoanthraquinone, and preferably about 1.75 mols of anhydride, are used in the instant improved process. The reaction is conducted in the presence of either phosphorus oxychloride or phosphorus trichloride or a mixture thereof. At least about 1.0 mol of the phosphorus agent is employed per mol of aminoanthraquione, preferably about 1.2 mols being used.

In accordance with a preferred mode of conducting the instant improved process, about 400–500 parts of perchloroethylene, from which the moisture had been previously driven off, about 16–20 parts of phosphorus oxychloride (or about 14–18 parts of phosphorus trichloride) and about 22–23 parts of 1-aminoanthraquinone are stirred together in a reaction vessel for about ½ – 2 hours. Thereafter, about 0.1–0.5 part of ammonium molybdate, about 19–26 parts of phthalic anhydride and about 20–50 parts of soda ash are added. The mixture is heated slowly to just below reflux temperature (above 105°–115° C.) and maintained thereat for about 16 hours. The perchloroethylene solvent is then removed by steam distillation and the residue, an aqueous slurry of crystals, is filtered. The resulting filter cake is washed with hot water and dried. Conventional means such as sand grinding, acid pasting, etc. are employed to convert the product to pigment form.

The perchloroethylene recovered from the reaction mass by steam distillation is phase separated from the aqueous portion of the distillate and can be recycled into the process.

Alternatively, and less preferably, the crude product can be isolated by cooling the reaction mass to below about 75° C., filtering the resultant slurry and washing the filter cake with a solvent miscible with perchloroethylene, e.g., methanol, ligroin, n-hexane, etc. Perchloroethylene is recovered from the mother liquor and wash liquor by distillation in a known manner. Although this isolation procedure is not preferred due to the step of washing the filter cake with low boiling solvent, it is still more efficient and convenient than procedures required heretofore, which entailed dilution of the reaction mass with relatively large volumes of the hazardous solvents.

Very unexpectedly, it has been found that N,N'-di-1-anthraquinonylphthalamide pigment can be obtained by the instant process in two distinct crystal forms. One, referred herein as the beta form, possesses a greenish-yellow color, and the other, referred herein as the alpha form, possesses a yellow color. The beta polymorph is obtained when the reaction mass is anhydrous and is free of "active oxygen"-containing compounds. The alpha polymorph is produced when the reaction is conducted in the presence of an "active oxygen"-containing compound.

By "active oxygen"-containing compound is meant herein those oxygen-containing compounds such as water, alcohols, ketones, aldehydes, carboxylic acids, etc. which are reactive with phosphorus oxychloride or phosphorus trichloride, exemplified by the following compounds:
water
methanol
ethanol
isopropanol
t-butanol
pentanol
2-ethylhexanol
n-dodecanol
phenol
cyclohexanol
β-naphthol
3-hydroxypyridine
acetone
methyl ethyl ketone
cyclohexanone
2-pyridone
acetophenone
acetaldehyde
butyraldehyde
acetoacetic ester
acetic acid
benzoic acid
isophthalic acid
phosphoric acid Mixtures of these and equivalent compounds might also be employed in the preparation of the alpha polymorph.

In the preparation of the alpha polymorph according to the instant process, an effective amount of the "active oxygen"-containing compound is incorporated in the reaction medium, by which is meant an amount sufficient to result in formation of the alpha polymorph rather than the beta polymorph. Whether a specific amount is an effective amount within the meaning of the instant invention can be determined by simple experimentation, with levels as low as 0.01 mol per mol of aminoanthraquinone, and even lower, being effective. Preferably at least about 0.025 mol per mol of aminoanthraquinone will be used.

That, N,N'-di-1-anthraquinonylphthalamide exists in two distinct crystalline forms is clearly shown by the respective X-ray diffraction powder patterns of the products obtained in the presence of and in the absence of "active oxygen"-containing compounds. FIG. 1, illustrating the X-ray diffraction powder pattern of the reddish-yellow alpha polymorph, shows diffraction lines corresponding to the following interplanar spacings expressed in Angstrom units: 20.5(vw), 10.0(m), 8.08(vs), 6.95(vw), 6.66(w), 6.28(m), 5.66(w), 51.0(vw), 4.64(vw), 3.86(s), 3.77(vw), 3.58(vw), 3.54(m), 3.39(vw), 3.21(w), 2.81(vw).

The greenish-yellow beta polymorph, on the other hand, has an X-ray diffraction powder pattern, as illustrated in FIG. 2, corresponding to the following interplanar spacings expressed in Angstrom units: 10.8(s), 7.60(m), 7.35(s), 6.69(vw), 6.35(m), 6.11(s), 5.34(m), 5.11(vw), 4.44(m), 4.00(m), 3.91(m), 3.80(m), 3.56(vs), 3.45(vw), 3.20(m), 2.95(w).

These X-ray diffraction patterns, wherein intensity is indicated by vs as very strong, s as strong, m as medium, w as weak, and vw as very weak, clearly demonstrate that the compound exists in two polymorphic forms. Infrared spectral studies were in essential agreement with X-ray diffraction results, with infrared spectra of the respective polymorphs differing in intensities of several absorption bands in the manner expected for different crystalline forms of the same compound. Also, differential thermal analysis supported the existence of two distinct polymorphs. The alpha polymorph melts at about 325° C., while the beta polymorph shows a small exotherm, possibly due to a beta-to-alpha polymorphic transition, with a subsequent melting point at about 335° C.

While previous syntheses of N,N'-di-1-anthraquinonylphthalamide have produced what is herein called the alpha polymorph, it is believed that the beta polymorph has not been prepared heretofore. It was unexpectedly discovered that the greenish-yellow pigment obtained by the process of aforesaid U.S. Pat. No. 2,914,542 does not contain the instant greenish-yellow beta polymorph. X-ray diffraction powder patterns of the material produced by the process of that reference indicate that the product is actually a mixture, of which about 80 percent is the polymorph referred herein as the alpha form. Furthermore, infrared spectral studies indicate that the additional component in the product mixture is a different compound rather than another crystalline form of the same basic molecule. This product mixture of U.S. Pat. No. 2,914,542 exhibits two major melting points at 285° and 315° C. with the lower melting point probably being that of the additional compound.

The two polymorphs produced by the instant process are useful as pigments in a manner well known to those skilled in the art. They possess good resistance to light, weather, solvents and heat, and can be used for pigment prints and dyeings on textiles, etc.

The following examples are provided to illustrate the instant invention more fully. As will be obvious to those skilled in the art, variations in the details set out therein can be made without departing from the scope or spirit of the invention. These examples are provided for illustrative purposes only and are not to be construed as limiting the invention, which is defined in the appended claims. In the examples, parts and percentages are by weight and temperatures are given in degrees centigrade unless otherwise indicated.

EXAMPLE I

α-N,N'-di-1-anthraquinonylphthalamide

A mixture of 1,820 parts of perchloroethylene, 0.32 part of methanol and 73.6 parts of phosphorus oxychloride were charged into a reaction vessel. The mixture was warmed to 33°–35 C. and 89.6 parts of 1-aminoanthraquinone was added thereto. The mixture was agitated for 1 hour, then 88 parts of phthalic anhydride, 132 parts of soda ash, and 0.8 part of ammonium molybdate were added thereto, and then the temperature was raised to 110° C. over a 5 hour period and maintained at 110°–115° C. for an additional 16 hours. Thereafter, the reaction mass was steam distilled to remove perchloroethylene, which, after separation from the aqueous portion of the steam distillate, can be recycled to a succeeding run.

The aqueous slurry remaining as residue after removal of the perchloroethylene was filtered and the filter cake was washed with water an dried to afford the alpha polymorph of N,N'-di-1-anthraquinonylphthalamide, 106.4 parts (92.07 percent yield). The product exhibited an X-ray diffraction powder pattern identical to that illustrated in FIG. 1 and is converted to the reddish-yellow pigment form by said grinding.

EXAMPLE II

α-N,N'-di-1-anthraquinonylphthalamide

The procedure of Example I was repeated wherein the reaction vessel was initially charged with 454 parts of perchloroethylene, 16.5 parts of phosphorus trichloride, 1.1 parts of methanol and 22.4 parts of 1-aminoanthraquinone, to which mixture was later added 26.0 parts of phthalic anhydride, 33.0 parts of soda ash and 0.2 part of ammonium molybdate. After being heated at 110°–115° C. for 16 hours, the reaction mixture was cooled to 60°–70° C. and the resultant slurry was filtered. The filter cake was washed with successive perchloroethylene, methanol, 1 percent aqueous hydrochloric acid and, finally, acid-free water. After drying, the crude product, alpha polymorph of N,N'-di-1-anthraquinonylphthalamide, 22.5 parts (74 percent yield), could be converted to pigment form.

EXAMPLE III

β-N,N'-di-1-anthraquinonylphthalamide

A mixture of 454 parts of perchloroethylene (dry), 18.4 parts of phosphorus oxychloride and 22.4 parts of 1-aminoanthraquinone was charged into a reaction vessel and agitated at ambient temperature for one hour. To this was added 0.2 part of ammonium molybdate, 26.0 parts of phthalic anhydride and 33 parts of soda ash. The resultant mixture was heated to 100° C. over a period of five hours and maintained at 110°–115° C. for an additional 16 hours, after which time it was cooled to 60° C. and filtered. The filter cake was washed with methanol and then with water, and was then dried to afford the beta polymorph of N,N'-di-1-anthraquinonylphthalamide 26.5 parts (91.7 percent yield). The product was then ground to a greenish-yellow pigment having an X-ray diffraction pattern as illustrated in FIG. 2.

EXAMPLE IV

α-N,N'-di-1-anthraquinonylphthalamide

The procedure of Example III was repeated wherein 0.1 part of water was additionally incorporated in the original reaction mixture, thereby affording the reddish-yellow alpha polymorph, 25.2 parts (87.2 percent yield).

EXAMPLE V

α-N,N'-di-1-anthraquinonylphthalamide

The procedure of Example III was repeated wherein 0.5 part of cyclohexanone was additionally incorporated in the original reaction mixture thereby affording the reddish-yellow alpha polymorph, 25.6 parts (88.6 percent yield).

EXAMPLE VI

β-N,N'-di-1-anthraquinonylphthalamide

The procedure of Example III is repeated, wherein the reaction mixture, after being maintained at 110°–115° C. for 16 hours, is steam distilled to remove perchloroethylene therefrom. The remaining aqueous slurry is filtered to afford the beta polymorph in high yield, which is then washed with water and dried.

What is claimed is:

1. In the process for the preparation of N,N'-dianthraquinonylphthalamides by reacting an aminoanthraquinone which may be substituted with chlorine and nitro, with at least about 1.5 mols of an orthophthalic anhydride which may be substituted with chlorine, bromine and nitro, per mole of the aminoanthraquinone in the presence of an inert solvent and at least about 1.0 mol of phosphorus oxychloride or phosphorus trichloride per mole of the aminoanthraquinone, the improvement which comprises employing perchloroethylene as solvent for said reaction.

2. The improved process of claim 1 which additionally comprises isolating the N,N'-dianthraquinonylphthalamide product by
   steam distilling said perchloroethylene solvent from the reaction mass to afford a residual aqueous slurry; and
   separating solid N,N'-dianthraquinonylphthalamide from said aqueous slurry.

3. In the process for the preparation of the alpha polymorph of N,N'-di-1-anthraquinonylphthalamide by reacting 1-aminoanthraquinone with at least about 1.5 mols of phthalic anhydride per mol of 1-aminoanthraquinone in the presence of an inert solvent and at least about 1.0 mol of phosphorus oxychloride or phosphors trichloride per mole of 1-aminoanthraquinone, the improvement which comprises employing perchloroethylene as solvent for said reaction, and incorporating therein an amount of an active oxygen-containing compound which is reactive with phosphorus oxychloride or phosphorus trichloride sufficient to result in formation of the alpha polymorph said active oxygen-containing compound being selected from the group consisting of water, alcohols, ketones, aldehydes, carboxylic acids and phosphoric acid.

4. The improved process of claim 3 wherein said active oxygen-containing compound is water.

5. The improved process of claim 3 wherein said active oxygen-containing compound is an alcohol.

6. The improved process of claim 3 wherein at least about 0.01 mol of said active oxygen-containing compound is incorporated in the reaction medium per mol of 1-aminoanthraquinone.

7. The improved process of claim 3 which additionally comprises isolating the alpha polymorph product by
   steam distilling said perchloroethylene from the reaction mass to afford a residual aqueous slurry; and
   separating solid alpha polymorph product from said aqueous slurry.

8. A process for the preparation of the beta polymorph of N,N'-di-1-anthraquinonylphthalamide which comprises reacting 1-aminoanthraquinone with at least about 1.5 mols of phthalic anhydride per mole of 1-aminoanthraquinone in perchloroethylene reaction medium containing at least about 1.0 mol of phosphorus oxychloride or phosphorus trichloride per mol of 1-aminoanthraquinone said medium being substantially free of an active oxygen-containing compound.

9. The process of claim 8 which additionally comprises isolating the beta polymorph product by
   steam distilling said perchloroethylene from the reaction mass to afford a residual aqueous slurry; and
   separating solid beta polymorph product from said aqueous slurry.

* * * * *